(12) United States Patent
Kim

(10) Patent No.: US 7,677,108 B2
(45) Date of Patent: Mar. 16, 2010

(54) ACCURATE PRESSURE SENSOR

(75) Inventor: Si-Hwan Kim, Incheon (KR)

(73) Assignee: Kyungdong Network Co., Ltd., Seoul (KR)

( * ) Notice: Subject to any disclaimer, the term of this patent is extended or adjusted under 35 U.S.C. 154(b) by 0 days.

(21) Appl. No.: 12/278,924

(22) PCT Filed: Jan. 9, 2007

(86) PCT No.: PCT/KR2007/000135

§ 371 (c)(1),
(2), (4) Date: Aug. 8, 2008

(87) PCT Pub. No.: WO2007/081131

PCT Pub. Date: Jul. 19, 2007

(65) Prior Publication Data

US 2008/0314156 A1    Dec. 25, 2008

(30) Foreign Application Priority Data

Jan. 10, 2006  (KR) ............... 10-2006-0002768
Jan. 8, 2007   (KR) ............... 10-2007-0002093

(51) Int. Cl.
*G01L 9/10* (2006.01)
(52) U.S. Cl. ............... 73/722; 73/735; 73/728
(58) Field of Classification Search ............ None
See application file for complete search history.

(56) References Cited

U.S. PATENT DOCUMENTS

| | | | |
|---|---|---|---|
| 4,717,873 A * | 1/1988 | Carr et al. ............ | 324/207.16 |
| 5,036,286 A * | 7/1991 | Holm-Kennedy et al. ... | 324/661 |
| 5,392,653 A * | 2/1995 | Zanger et al. ............ | 73/756 |
| 6,396,259 B1 | 5/2002 | Washeleski et al. | |
| 6,522,130 B1 | 2/2003 | Lutz | |
| 6,981,421 B2 | 1/2006 | Palmer et al. | |
| 2002/0038570 A1 * | 4/2002 | Burns ............ | 73/146 |
| 2005/0134257 A1 | 6/2005 | Etherington et al. | |

FOREIGN PATENT DOCUMENTS

| | | |
|---|---|---|
| JP | 09-170958 | 6/1997 |
| KR | 0119708 | 7/1996 |
| KR | 0273056 | 4/2002 |

OTHER PUBLICATIONS

International Search Report for Application No. PCT/KR2007/000135, dated Apr. 6, 2007.

* cited by examiner

*Primary Examiner*—Andre J Allen
(74) *Attorney, Agent, or Firm*—Lahive & Cockfield, LLP; Thomas V. Smurzynski; Anthony A. Laurentano

(57) ABSTRACT

The invention relates to a pressure sensor capable of measuring pressure accurately, and more particularly, to a pressure sensor comprising a box-shaped magnet, optionally having an inclined upper surface with a right side portion protruding higher than a left side portion, wherein the magnet is configured to radiate linear magnetic flux density in response to a change in distance along a straight line spaced uniformly apart from an N or S pole surface, whereby the pressure sensor can accurately detect a displacement in distance (position) and thus a pressure difference based on the displacement. The pressure sensor further includes a pipe connecting negative and positive pressures, a diaphragm movable in response to a difference between negative and positive pressures, a diaphragm support attached to a side of the diaphragm, a magnet attached to the diaphragm support to radiate linear magnetic flux density, a spring supporting the magnet, and the diaphragm and upper and lower cases housing these components.

16 Claims, 3 Drawing Sheets

[Fig. 1]
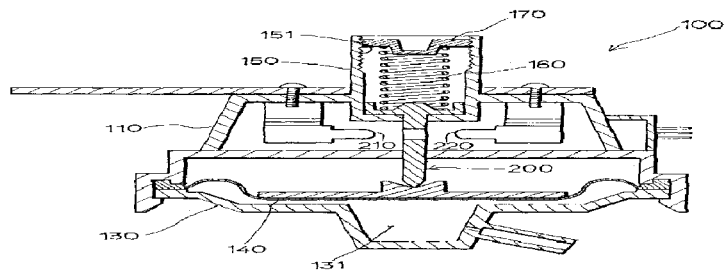
[Fig. 2]
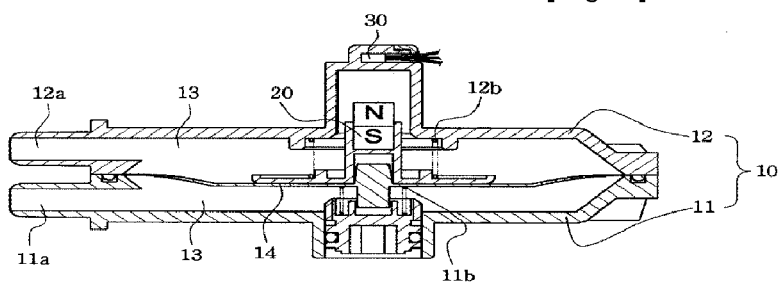
[Fig. 3]
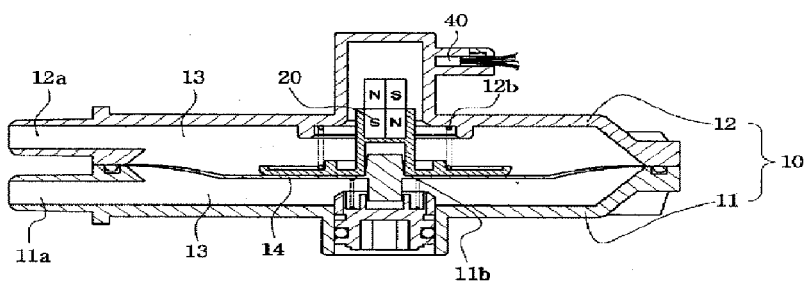
[Fig. 4]
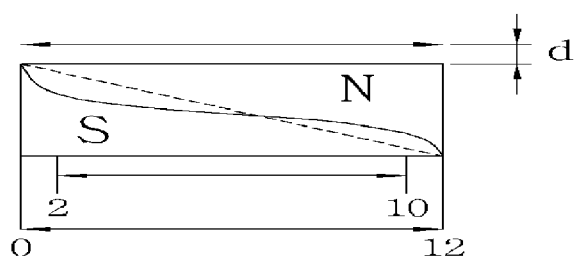
[Fig. 5]
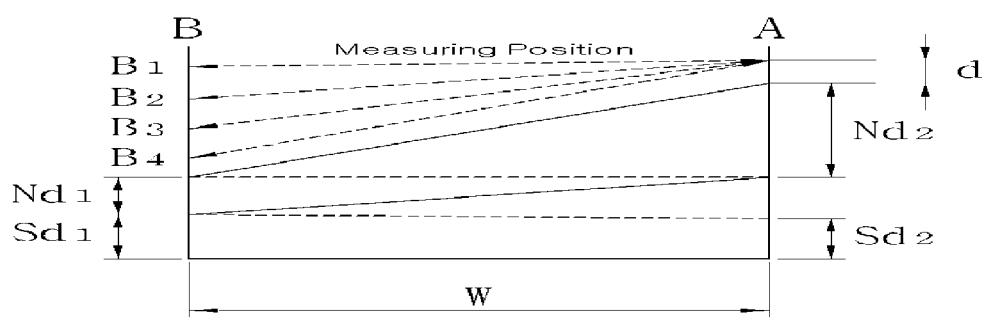

[Fig. 6]
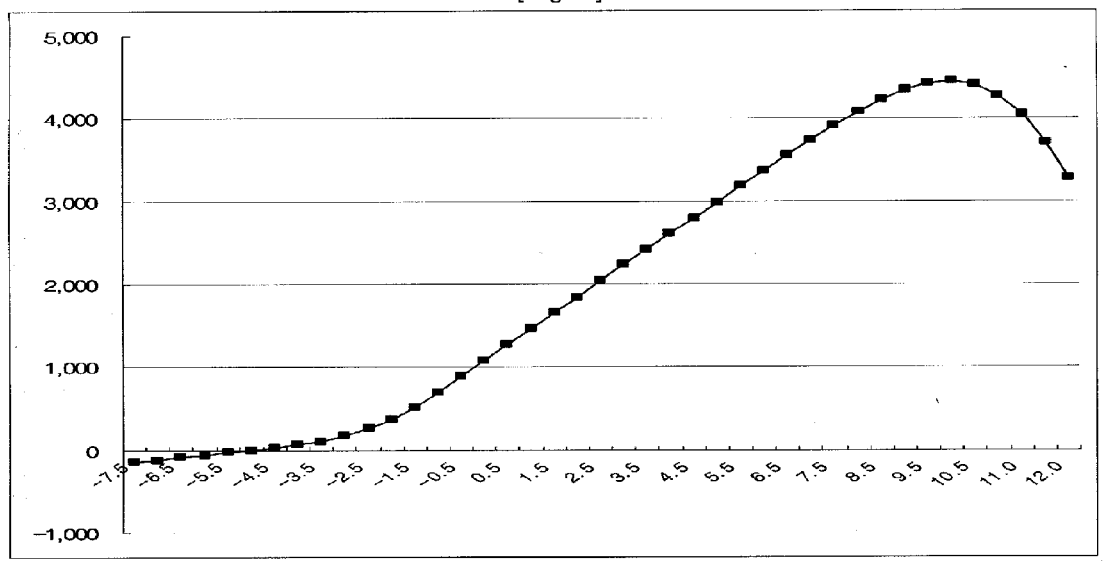
[Fig. 7]
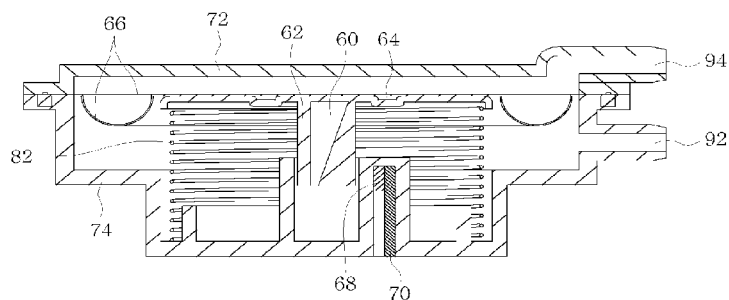
[Fig. 8]
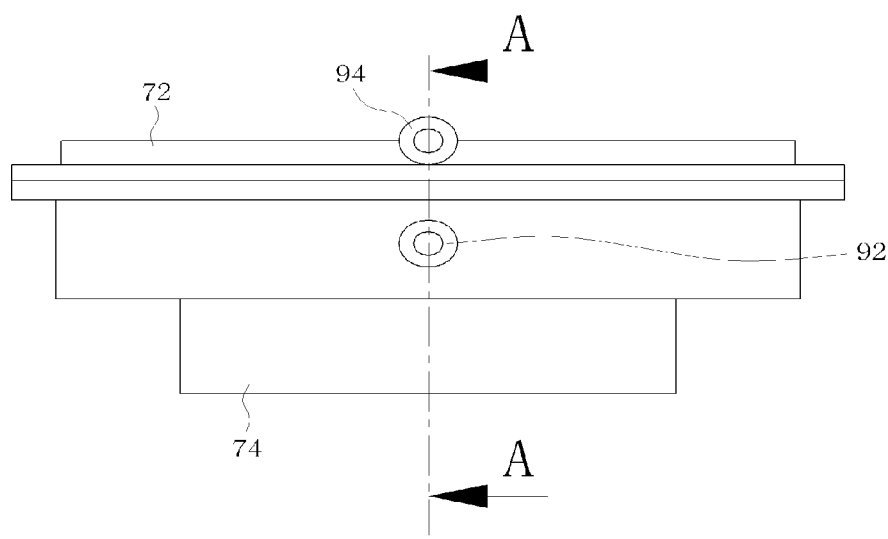

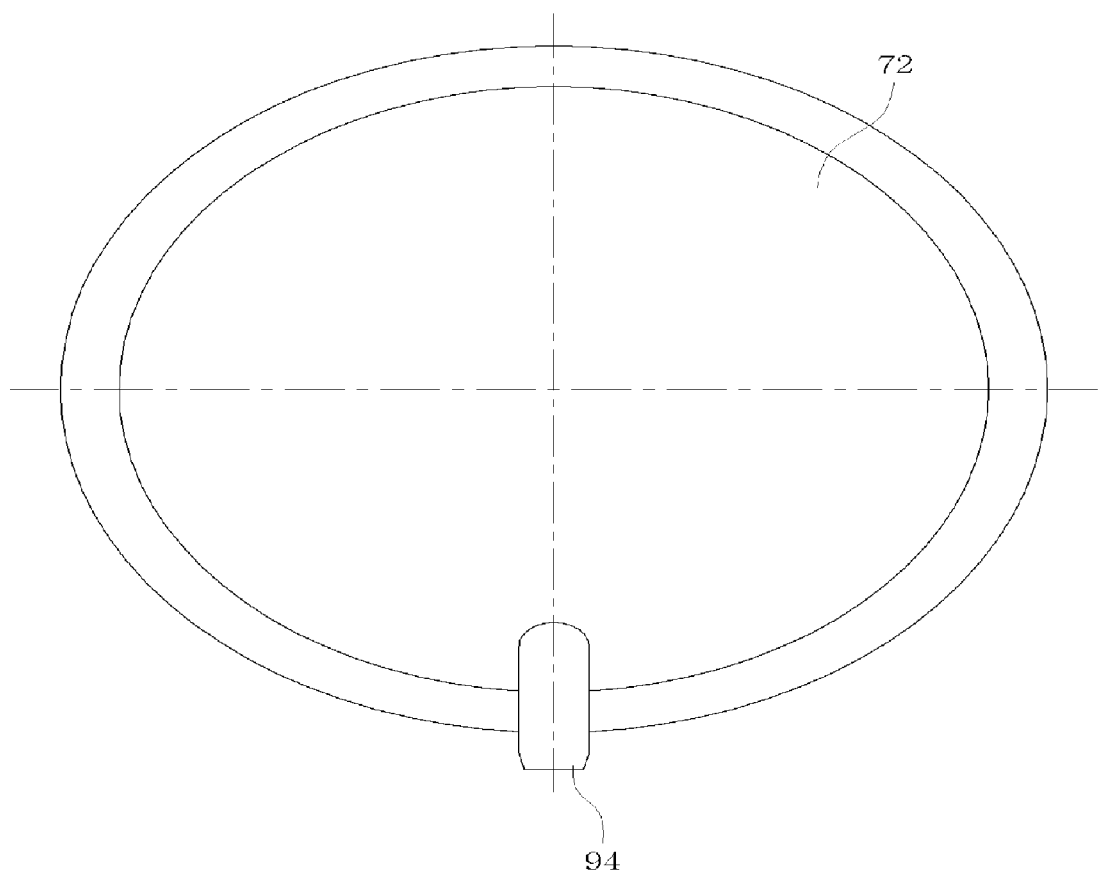
[Fig. 9]

ACCURATE PRESSURE SENSOR

TECHNICAL FIELD

The present invention relates to a pressure sensor capable of measuring pressure accurately, and more particularly, to a pressure sensor comprising a box-shaped magnet optionally having an inclined upper surface, with a right side portion protruding higher than a left side portion, wherein the magnet is configured to radiate linear magnetic flux density in response to a change in distance along a straight line spaced uniformly from an N or S pole surface, whereby the pressure sensor can accurately detect a displacement in distance (position), and thus a pressure difference based on the displacement.

BACKGROUND ART

Prior to describing pressure sensors, the general characteristics of magnets used herein will be explained first.

Magnets are made of a material having a magnetic force for attracting iron powder. A strong, industrially fabricated magnet is referred to as a permanent magnet, and is also referred to in brief simply as a magnet.

Iron powder placed beside the magnet is attracted to the magnet. The space under the influence of this magnetic force is referred to as a magnetic field. In other words, the magnet can be understood to produce the magnetic field. The shape of the magnetic field can be displayed using a pattern of iron powder. When iron powder is uniformly scattered on a thick sheet of white paper placed on the magnet, the lines of magnetic force are observed in a specific pattern. The needle of a small compass placed along one of the lines of magnetic force is oriented according to the direction of the line of magnetic force from the N pole to the S pole.

The magnitude of the force between the two poles is determined according to Coulomb's law, that is, it is inversely proportional to the square of the distance between the poles but proportional to the strength of the magnetic poles. Since the magnetic poles are composed of a pair of N and S poles having the same strength, the magnetic moment is considered a more essential physical quantity than the strength of the magnetic poles. The magnetic moment is expressed as a vector directed from the S pole towards the N pole. The force calculated between two magnetic moments is proportional to the fourth power of the distance. Thus, the attractive force between two magnets is strong when the magnets are placed near each other, but quickly drops when the magnets are separated from each other.

Magnetization occurs when magnetic zones change properties of a structure, such as the shape, arrangement and orientation thereof. Once magnetized, the changed structure rarely changes its state or returns to its original state, owing to residual magnetization, even after a magnetic field has been completely removed. A material having residual magnetization to a great extent is referred to as a permanent magnet.

Magnetic flux is produced by integrating magnetic flux density or magnetic induction for a sectional area perpendicular to the direction thereof. The magnetic flux is expressed in maxwells (with the symbol Mx) in the CGS system or in webers (with the symbol Wb) in the MKS or SI system. As the magnetic flux passing through a coil changes according to time, voltage proportional to the rate of change is present at both ends of the coil (i.e., Electromagnetic induction of Faraday). This voltage is induced in the direction in which a magnetic field created by current interrupts any change in magnetic flux. This is called Lenz's Law. The magnetic flux is created by a permanent magnet or a current flowing through a coil.

Various types of sensors may be used according to methods for detecting a magnetic field. A Hall sensor is probably the best-known sensor. The Hall sensor is operated by an electric current applied to electrodes of a semiconductor device (Hall device). After the electric current is applied to the electrodes, a magnetic field is induced vertically to cause an electric potential in a direction perpendicular to both the current and the magnetic field.

The Hall sensor is the simplest distance-measuring device, using a permanent magnet and a detector for magnetic flux. The Hall sensor measures changes in magnetic flux density according to distance from the permanent magnet, and thus determines the distance based on the electric potential caused by the detector.

However, since the magnetic flux density generated by the permanent magnet is not linear according to distance, the Hall sensor should be equipped with a program or an electronic circuit for compensating for non-linearity in order to function as a more accurate distance-measuring device. In addition, many studies have been carried out to provide a structure capable of measuring linear magnetic flux density in order to compensate for the non-linear distribution of magnetic flux density according to distance. Such structures include several types of magnets and combinations thereof.

Recently, many types of non-contact distance-measuring devices have been developed in order to detect the absolute position of a body while measuring linear and angular displacement.

There are various types of non-contact distance-measuring devices. A device using a sliding register potentiometer is best known, but is not sufficiently reliable. An optical positioner is an optical sensor for reading optical ranges such as slits, but has a complicated structure. There is an approach of using a magnetic sensor to read magnetic sections on a magnetic medium, but this has a complicated structure and absolute position cannot be detected.

That is, only the distance between two points can be measured. The present invention aims to utilize a magnet having linear magnetic flux density, capable of detecting the absolute position of a body to be measured. By using the magnet having a very simple structure, a long measuring range and a high reliability, it is possible to measure distances more accurately using an inexpensive sensor without having to use a program or electronic circuit for compensating for non-linearity.

The present invention involves a pipe connecting negative and positive pressures, a diaphragm movable in response to the difference between negative and positive pressures, a diaphragm support attached to one side of the diaphragm, a magnet attached to the diaphragm support to radiate linear magnetic flux density, a spring supporting the magnet and the diaphragm, and upper and lower cases housing these components.

The term "pressure" indicates force acting on contact surfaces of two objects, in which the two objects contact and push each other in a direction perpendicular to the contact surfaces. The pressure may also be force acting inside a single object when internal parts push each other. In this case, both parts are considered to apply the force (stress) against each other on a single face inside the object. If the force is not perpendicular to the face, the force is divided into a component that is perpendicular to the face and another component that is parallel to the face, in which the force component that is perpendicular to the face is also referred to as pressure (pulling force is referred to as 'tension').

Since pressure uniformly acts on a face, the intensity of pressure applied to every point on the face is determined differently according to the area of the face even with the same total force (total pressure). When a force or pressure having a magnitude of P is applied uniformly on an object having a size of S, the intensity of pressure is defined by P/S. When an object is placed on a table, the intensity of pressure is generally different according to the position of a contact face. The intensity of pressure on each point of the contact face can be obtained from a minute area including the point. The intensity of pressure is also referred to simply as 'pressure'.

Several types of pressure sensors are currently used, and are selected according to the object to be measured.

The objects to be measured may be classified generally into fluids, solids and gases. A stress gauge is a representative pressure sensor for measuring the pressure of solid objects. However, a diaphragm is generally used to measure the pressure of fluid or gas, since the relative pressure of fluid or gas has to be measured.

The relative pressure can be measured based on the displacement of the diaphragm in combination with a spring, in which the diaphragm is displaced by a relative pressure difference.

The present invention relates to a sensor for measuring relative pressure using a diaphragm and a spring, which can be used variously to measure the pressure of fluid or gas.

The present invention provides an embodiment that is applicable to a boiler having a pressure sensor capable of measuring the flow rate of inflow air. Conventionally, an on/off type pressure sensor (wind pressure sensor) has been used to measure the air pressure (wind pressure) in a boiler. In the pressure sensor (wind pressure sensor), the pressure of air introduced by an air blower is transferred to the diaphragm of the sensor so that a micro-switch attached to the diaphragm switches on/off an electric circuit to regulate the rate of flow of air. However, since the pressure sensor is used at a fixed operating pressure, the pressure sensor is determined according to the type of the air blower.

In addition, the pressure sensor does not accurately measure the flow rate of inflow air. The pressure sensor can merely assist in increasing/decreasing the pressure (flow rate) of inflow air by regulating the rotating speed of the air blower according to the pressure of inflow air.

Various types of pressure sensors are used to detect the pressure of fluid, and several types of pressure sensors capable of detecting flow rate using flow pressure (differential pressure) have been proposed.

FIG. 1 shows a conventional pressure sensor for sensing water level, as disclosed in Korean Utility Registration No. 0119708. As shown in FIG. 1, the pressure sensor includes a body 100 having upper and lower covers 110 and 130 and a diaphragm 140 arranged inside the body 100. The pressure sensor detects the pressure in a hydraulic chamber 131 based on a change in the diaphragm 140, which is caused by a pressure change in the hydraulic chamber 131. The pressure sensor also has a light shielding member 200 configured to change its cross section in proportion to the change in the diaphragm 140 in order to control the amount of light passing through the light shielding member 200. A light emitting device, such as a Light Emitting Diode (210), and a phototransistor 220 are arranged on opposite sides of an elevating path of the light shielding member 200 relative to each other. A tubular body 150 having threads 151 in the inside wall is arranged in the upper cover 110, and a spring 160 having a predetermined elasticity is contained in the tubular body 150. The elasticity of the spring 160 is adjustable according to the upward/downward movement of a cover 170, which is screwed into the threads 151 in the inside wall of the tubular body 150. With this arrangement, the pressure in the hydraulic chamber 132 is detected based on the output voltage of the phototransistor 220, which is variable according to the quantity of light applied from the LED 210. Consequently, the pressure sensor can detect the water level based on a change in voltage, which is determined by a change in the quantity of light from an optical coupling device.

FIG. 2 shows another type of pressure sensor, disclosed in Korean Utility Registration No. 0273056. As shown in FIG. 2, the pressure sensor includes a housing member 10 which has a space 13 for fluid received and discharged through circulation ports 11a and 12a and a diaphragm 14 flexing upward and downward due to the elasticity of an elastic body in response to the pressure of fluid. The pressure sensor also has a permanent magnet 20 for moving upward and downward in an operating region in response to the diaphragm 14 and a sensor member 30 arranged adjacent to the operating region of the permanent magnet 20 to detect the magnetic force thereof. Using the sensor member 30, the pressure sensor can detect a change in the magnetic force of the permanent magnet 20, which moves precisely in response to changes in the pressure of the fluid, thereby more accurately measuring changes in the flow rate and/or the pressure of fluid.

DISCLOSURE OF INVENTION

Technical Problem

However, the permanent magnet and the sensor member 30 cannot be used to obtain accurate position information or positional measurement, owing to non-linearity of the magnet.

Described in more detail with reference to FIG. 2, non-contact type arrangement is used to measure the displacement of the diaphragm 14, which moves in response to a difference in pressure in a sealed interior. This arrangement is merely an adaptation of a typical non-contact proximity sensor, made in order to measure the intensity of a magnetic field. Even though an expensive and complicated conversion algorithm is used to linearly convert a non-linear distribution of magnetic flux density, that is, a decrease in density according to distance that is inversely proportional to the square of the distance, as typically observed in a magnet, basic error in the algorithm or in a measuring device cannot be completely overcome.

Another approach provides an arrangement having four (4) polarities, as shown in FIG. 3. In this arrangement of four polarities, a sensor member 30 for measuring the magnetic force of a permanent magnet 20 is provided on one side of an operation section, where the permanent magnet 20 moves upward and downward. However, non-linear properties of the magnet also impart non-linearity to sensor information, such as the measured result of magnetic flux density. Consequently, the actual position cannot be measured, rather, distorted position information is obtained, attributable to non-linearity.

Distorted position information, as outlined above, causes inaccuracy of input information, which is basic information for device control. When a boiler or device is controlled based on inaccurate information, a facility or equipment is operated inefficiently.

Accordingly, a pressure sensor capable of detecting displacement, and thus a pressure difference, more accurately, is needed.

Technical Solution

The present invention has been made to solve the foregoing problems of the prior art and it is therefore an object of the present invention to provide a pressure sensor capable of measuring pressure more accurately, and more particularly, to a pressure sensor comprising a box-shaped magnet optionally having an inclined upper surface with a right side portion protruding higher than a left side portion, wherein the magnet is configured to radiate linear magnetic flux density in response to a change in distance along a straight line spaced uniformly from an N or S pole surface, whereby the pressure sensor can accurately detect a displacement in distance (position) and thus pressure difference based on the displacement.

Advantageous Effects

In a precision control device for carrying out precise control by detecting pressure, inaccurate control has been inevitable owing to incorrect positional information of a conventional position sensor. However, the pressure sensor of the invention can detect a pressure difference accurately, and thus enable more accurate control.

BRIEF DESCRIPTION OF THE DRAWINGS

FIG. 1 is a cross-sectional view illustrating a conventional pressure sensor using light;

FIG. 2 is a cross-sectional view illustrating another conventional pressure sensor using a magnet;

FIG. 3 is a cross-sectional view illustrating a further conventional pressure sensor using a plurality of magnets;

FIG. 4 is a conceptual view illustrating the structure of a magnet and a magnetization configuration thereof according to an embodiment of the invention;

FIG. 5 is a conceptual view illustrating the structure of a magnet and a magnetization configuration thereof according to another embodiment of the invention;

FIG. 6 is a graph illustrating a change in magnetic flux density according to the invention, mapped with triangles and quadrangles;

FIG. 7 is a cross-sectional view illustrating an accurate pressure sensor with a magnet radiating linear magnetic flux density according to the invention;

FIG. 8 is a side elevation view illustrating the accurate pressure sensor with a magnet radiating linear magnetic flux density according to the invention; and FIG. 9 is a plan view illustrating the accurate pressure sensor with a magnet radiating linear magnetic flux density according to the invention.

BEST MODE FOR CARRYING OUT THE INVENTION

The present invention provides an accurate pressure sensor including a box-shaped magnet, wherein the magnet comprises N and S poles magnetized along a sine wave oriented in a diagonal direction, and has linear magnetic flux density oriented along a straight line spaced apart from and parallel to a polar surface of the magnet, whereby the accurate pressure sensor can accurately measure relative displacement to detect pressure using the box-shaped magnet.

Mode for the Invention

Hereinafter, preferred embodiments of the invention will be described in detail with reference to the accompanying drawings.

In the accompanying drawings, FIG. 1 is a cross-sectional view illustrating a conventional pressure sensor using light, FIG. 2 is a cross-sectional view illustrating another conventional pressure sensor using a magnet, FIG. 3 is a cross-sectional view illustrating a further conventional pressure sensor using a plurality of magnets, FIG. 4 is a conceptual view illustrating the structure of a magnet and a magnetization configuration thereof according to an embodiment of the invention, FIG. 5 is a conceptual view illustrating the structure of a magnet and a magnetization configuration thereof according to another embodiment of the invention, FIG. 6 is a graph illustrating a change in magnetic flux density according to the invention, mapped with triangles and quadrangles, FIG. 7 is a cross-sectional view illustrating an accurate pressure sensor with a magnet radiating linear magnetic flux density according to the invention, FIG. 8 is a side elevation view illustrating the accurate pressure sensor with a magnet radiating linear magnetic flux density according to the invention, and FIG. 9 is a plan view illustrating the accurate pressure sensor with a magnet radiating linear magnetic flux density according to the invention.

FIGS. 1 to 3 show conventional sensors as described above, and FIG. 4 illustrates the structure of a magnet and a magnetization configuration thereof according to the invention.

As shown in FIG. 4, when the magnet is magnetized along a dotted diagonal line, the magnetic flux density of the N pole according to displacement is inversely proportional to the square of the distance. As magnetic flux is distributed along the diagonal line, when the magnetic flux density is measured at a point spaced 1 mm apart from the measuring N pole, a magnetic flux graph shows that the magnetic flux density does not vary linearly according to displacement. Thus, in order to exhibit linearity in a predetermined area, the magnetization configuration is changed, as indicated by the solid line in FIG. 4.

In order to impart linearity to the variation of the magnetic flux density according to the distance in a predetermined range, the magnetization configuration is slightly distorted along the diagonal line as shown in FIG. 4.

In FIG. 4, the sensor performs measurement on displacement along sections 0 to 12 of the magnet. A specific gap d is maintained from the surface of the pole perpendicularly to the polar axis, moving in a direction parallel to the surface of the pole. Except for skirt sections showing slight non-linearity of the sections 0 to 12 of the magnet, inner sections 2 to 10 can be used as more accurate sections of the sensor.

In order to measure changes in magnetic flux density depending on distance, a programmable Hall IC was used to measure changes in magnetic flux density according to displacement. The programmable Hall IC is commercially available from Micronas, and has an error rate of ±1%. The measurement results are reported by the graph in FIG. 6.

FIG. 6 is a graph illustrating a change in magnetic flux density according to the invention, in which magnetic flux density according to displacement shows linearity in the whole sections 0 to 12, in particular, substantially perfect linearity in some sections 2 to 8. It can be appreciated that the magnetization configuration was altered in order to produce linear magnetic flux density per unit displacement in some sections. However, the magnetization configuration should be designed based on the distance where measurement is carried out, since the magnetic flux density is proportional to the square of the measuring distance.

FIG. 5 is a conceptual view illustrating the structure of a magnet and a magnetization configuration thereof according to another embodiment of the invention, in which an N pole is arranged on an S pole. The reference sign W indicates the width of the bottom of the magnet, which may be adjusted if necessary. The reference sign Sd1 indicates the left edge of the S pole, and Sd2 indicates the right edge of the S pole. The reference sign Nd1 indicates the left edge of the N pole, and Nd2 indicates the right edge of the N pole. Accordingly, Sd1+Nd1 indicates the left edges of the N and S poles while Sd2+Nd2 indicates the right edges of the N and S poles. This consequently provides a box-like configuration, with the right edge longer than the left edge.

Expressing the configuration of the magnet in numbers, the left edge of the S pole is 1, the right edge of the S pole is 2, the left edge of the N pole is 1, and the right edge of the N pole is 2. Thus, in the resultant arrangement, composed of the S and N poles, the left edge is 2 and the right edge is 4, which is twice that of the left edge.

Preferably, in the N and S poles, the ratio of the right edge to the left edge is preferably in the range from 1 to 4.

A magnet was magnetized to have the configuration shown in FIG. 5, and changes in magnetic flux density according to displacement were measured. Measurements were carried out at points on lines connecting a point A and points B1 to B4, respectively, where the point A is spaced apart from the top end of the right edge of the magnet by a distance d, and the points B1 to B4 are on a line extending from the left edge of the magnet, and generally indicated as B.

Described in greater detail, a point A spaced apart a predetermined length from the end of an edge where the magnetic density of an N or S pole has the highest value is the starting point of measurement by the sensor, and a point B4 spaced apart a pre-determined length from the end of an opposite edge, where the magnetic density of the N or S pole has the lowest value, are end points of measurement by the sensor.

Whether or not the magnetic density is linear along a straight line (connecting between the starting point A and the end point B) parallel to a pole surface from the starting point A to the end point B is measured. By repeatedly increasing the distance of the end point from the pole surface up to the point B1, which has the same height as the starting point A, the linearity of magnetic flux density is determined in order to find the last point where the magnetic flux density maintains linearity.

Therefore, measurement results show excellent linearity in positions shown in the graph in FIG. 6. Such results, including starting and end points that are highly linear, are applicable to a sensor.

As shown in FIG. 5, different measurement positions are selected according to different angles in order to find the position of the highest linearity. It should also be considered that higher magnetic flux density has a smaller track, which influences magnetic flux, but lower magnetic flux density has a larger track, which influences magnetic flux. The point A, spaced apart from the pole surface, to be measured initially can be determined differently. The height ratio between the left and right edges may be changed according to the size and magnetic intensity of the magnet, and thus the configuration of the magnet may also be varied.

FIG. 6 is a graph illustrating a change in magnetic flux density according to the invention, mapped with triangles and quadrangles, in which the result obtained by modifying the magnetism of the box-shaped magnet to impart more precise linear magnetic flux density is substantially the same as the result obtained by changing the configuration of the magnetism. In actually effective sections of the magnet, linearity can be found from changes in magnetic flux density. This produces a magnet having linear magnetic flux density in a straight line connecting between the starting and end points, so that precise absolute positions can be determined using the magnet, and thus precise control can be carried out.

FIG. 7 is a cross-sectional view illustrating an accurate pressure sensor with a magnet radiating linear magnetic flux density according to the invention, FIG. 8 is a side elevation view illustrating the accurate pressure sensor with a magnet radiating linear magnetic flux density according to the invention, and FIG. 9 is a plan view illustrating the accurate pressure sensor with a magnet radiating linear magnetic flux density according to the invention.

The pressure sensor includes upper and lower cases 72 and 74, coupled with each other to define an inner space, and a diaphragm 66 interposed between the upper and lower cases 74 to divide the inner space into two compartments.

A holder 64 is provided on the underside of the diaphragm 66 to securely attach the diaphragm 66 to a diaphragm support 62 so that the diaphragm support 62 and the diaphragm 66 can move in conjunction with each other in response to changes in pressure. A magnet 60 configured to radiate linear magnetic flux density along a line connecting starting and end points, as described above, is coupled to the underside of the diaphragm support 62. An N or S pole surface of the magnet 60 is aligned with the movement direction of the diaphragm 66, and is spaced a predetermined distance apart from and parallel to a magnetic sensor 68, such as a programmable Hall IC.

The magnetic sensor 68 is connected to a PCB 70 to transfer an electric signal, such as pressure data, to a controller according to the end use of the pressure sensor.

A spring 82 is arranged under the diaphragm support 62 and acts to maintain the balance between positive and negative pressures, and the diaphragm 66 moves upward or downward in response to pressure differences applied thereto. The extent of deformation of the spring differs according to the pressure differences, that is, the extent to which the positive pressure is larger than the negative pressure. Thus, the magnetic sensor 68 can measure the linearly changing magnetic flux density of the magnet 60 to detect the degree of deformation of the spring, thereby determining absolute deformation locations.

While the present invention has been described with reference to a particular accurate pressure sensor, it is not to be limited thereto, but will be defined by the appended claims. It is to be appreciated that those skilled in the art can substitute, change or modify the embodiments into various forms without departing from the scope and spirit of the present invention.

INDUSTRIAL APPLICABILITY

In a precision control device for carrying out precise control by detecting pressure, inaccurate control has been inevitable to date, owing to incorrect position information from conventional position sensors. However, according to the invention, the precision control device can carry out precise control based on accurate pressure detection. That is, the pressure sensor of the invention can detect a pressure difference accurately, and thus enable more accurate control.

The invention claimed is:
1. An accurate pressure sensor comprising:
   a box-shaped magnet, wherein the magnet comprises N and S poles magnetized along a sine wave oriented in a diagonal direction, and has magnetic flux density linear along a straight line spaced apart from and parallel to a polar surface of the magnet, whereby the sensor accurately measures relative displacement, thus detecting pressure using the box-shaped magnet.

2. The accurate pressure sensor according to claim 1, wherein the magnet has linear magnetic flux density in response to a change in distance along a straight line parallel to a pole surface connecting starting and end points to be measured by the sensor, from the starting point to the end point, wherein the starting point to be measured by the sensor is spaced a predetermined length apart from an end of an edge where the magnetic density of the N or S pole has a maximum value, and the end point to be measured is spaced a predetermined length apart from an end of an opposite edge where the magnetic density of the N or S pole has a minimum value, and whereby relative displacement along the line parallel to the pole surface is accurately measured, to thus detect relative pressure.

3. The accurate pressure sensor according to claim 2, wherein the magnet has linear magnetic flux density along a line spaced an optimal distance apart from, and aligned parallel to, a pole surface, wherein magnetic flux density measured by the sensor maintains optimum linearity with respect to displacement on the line, the optimum linearity found by repeatedly moving parallel to and spaced a predetermined distance apart from the pole surface, whereby the sensor is located at an optimum position on the straight line parallel to the pole surface and accurately measures the relative displacement in response to the change in distance, and thus detects relative pressure.

4. The accurate pressure sensor according to claim 1, further comprising:
a diaphragm support coupled with a diaphragm, wherein a N or S pole surface of the magnet is arranged on the diaphragm support in a direction perpendicular to a direction of movement of the diaphragm;
a magnetic sensor for locating the magnet, arranged parallel to the N or S pole surface and perpendicular to an underside of a lower case;
a spring arranged between a lower portion of the diaphragm support and an underside of the lower case;
the diaphragm, dividing an inner space defined by an upper case and the lower case into upper and lower compartments;
a positive pressure connecting part communicating with the upper compartment; and
a negative pressure connecting part communicating with the lower compartment, whereby absolute or relative displacement of the magnet coupled with the diaphragm support is measured accurately in response to upward and downward movement of the diaphragm, and thus the sensor detects pressure.

5. An accurate pressure sensor used for a sensor for measuring changes in relative distance, comprising:
a magnet having a box-shaped configuration with an inclined upper surface, in which a right edge protrudes higher than a left edge, wherein the magnet has linear magnetic flux density along a straight line parallel to a pole surface connected between starting and end points to be measured by the sensor, wherein the starting point to be measured by the sensor is spaced a predetermined length apart from an end of an edge where a magnetic density of the N or S pole has a maximum value, and the end point to be measured is spaced a predetermined length apart from an end of an opposite edge where the magnetic density of the N or S pole has a minimum value, whereby the sensor accurately measures the relative distance using the magnet to thus detect pressure.

6. The accurate pressure sensor according to claim 5, wherein the N and S poles are magnetized to a metal member having a length ratio of a right edge to a left edge in a range of 1 to 1-4, and the sensor accurately measures the relative distance using the magnet, having linear magnetic flux density along the straight line connected between the starting and end points, and thus detects pressure.

7. The accurate pressure sensor according to claim 6, wherein the magnetic flux density of the magnet changes linearly along a pole surface of the N or S pole, and the sensor accurately measures the relative distance using the magnet, having linear magnetic flux density along the straight line connected between the starting and end points, and thus detects pressure.

8. The accurate pressure sensor according to claim 7, wherein the starting point to be measured by the sensor is spaced the predetermined length apart from the end of the edge where the magnetic density of the N or S pole has the maximum value, and the end point to be measured is spaced the predetermined length apart from the end of the opposite edge where the magnetic density of the N or S pole has the minimum value, and the sensor is located at the starting and end points, which are determined by measuring whether or not the magnetic density is linear along a straight line connecting the starting and end points, which are parallel to the pole surface, from the starting point to the end point, and repeatedly increasing the distance of the end point from the pole surface up to a point having the same height as the starting point to determine whether or not the magnetic flux density remains linear.

9. The accurate pressure sensor according to claim 5, further comprising:
a diaphragm support coupled with a diaphragm, wherein an N or S pole surface of the magnet is arranged on the diaphragm support in a direction perpendicular to a direction of movement of the diaphragm;
a magnetic sensor for locating the magnet, arranged parallel to the N or S pole surface and perpendicular to an underside of a lower case;
a spring arranged between a lower portion of the diaphragm support and an underside of the lower case;
the diaphragm dividing an inner space defined by an upper case and the lower case into upper and lower compartments;
a positive pressure connecting part communicating with the upper compartment; and
a negative pressure connecting part communicating with the lower compartment, whereby relative displacement of the magnet coupled with the diaphragm support is measured accurately in response to upward and downward movement of the diaphragm, and thus the sensor detects pressure.

10. An accurate pressure sensor, comprising:
a diaphragm support coupled with a diaphragm, wherein an N or S pole surface of a magnet is spaced apart from the diaphragm support by a predetermined gap, arranged in a direction perpendicular to a direction of movement of the diaphragm, and has linear magnetic flux density along a line connecting starting and end points;
a magnetic sensor for locating the magnet, arranged parallel to the N or S pole surface and perpendicular to an underside of a lower case;
a spring arranged between a lower portion of the diaphragm support and the underside of the lower case;
the diaphragm dividing an inner space defined by an upper case and the lower case into upper and lower compartments;
a positive pressure connecting part communicating with the upper compartment; and
a negative pressure connecting part communicating with the lower compartment, whereby a relative displacement of the magnet coupled with the diaphragm support 11. The accurate pressure sensor according to claim 1, further comprising:
- a diaphragm support coupled with a diaphragm, wherein a N or S pole surface of the magnet is arranged on the diaphragm support in a direction perpendicular to a direction of movement of the diaphragm;
- a magnetic sensor for locating the magnet, arranged parallel to the N or S pole surface and perpendicular to an underside of a lower case;
- a spring arranged between a lower portion of the diaphragm support and an underside of the lower case;
- the diaphragm, dividing an inner space defined by an upper case and the lower case into upper and lower compartments;
- a positive pressure connecting part communicating with the upper compartment; and
- a negative pressure connecting part communicating with the lower compartment, whereby absolute or relative displacement of the magnet coupled with the diaphragm support is measured accurately in response to upward and downward movement of the diaphragm, and thus the sensor detects pressure.

12. The accurate pressure sensor according to claim 2, further comprising:
- a diaphragm support coupled with a diaphragm, wherein a N or S pole surface of the magnet is arranged on the diaphragm support in a direction perpendicular to a direction of movement of the diaphragm;
- a magnetic sensor for locating the magnet, arranged parallel to the N or S pole surface and perpendicular to an underside of a lower case;
- a spring arranged between a lower portion of the diaphragm support and an underside of the lower case;
- the diaphragm, dividing an inner space defined by an upper case and the lower case into upper and lower compartments;
- a positive pressure connecting part communicating with the upper compartment; and
- a negative pressure connecting part communicating with the lower compartment, whereby absolute or relative displacement of the magnet coupled with the diaphragm support is measured accurately in response to upward and downward movement of the diaphragm, and thus the sensor detects pressure.

13. The accurate pressure sensor according to claim 3, further comprising:
- a diaphragm support coupled with a diaphragm, wherein a N or S pole surface of the magnet is arranged on the diaphragm support in a direction perpendicular to a direction of movement of the diaphragm;
- a magnetic sensor for locating the magnet, arranged parallel to the N or S pole surface and perpendicular to an underside of a lower case;
- a spring arranged between a lower portion of the diaphragm support and an underside of the lower case;
- the diaphragm, dividing an inner space defined by an upper case and the lower case into upper and lower compartments;
- a positive pressure connecting part communicating with the upper compartment; and
- a negative pressure connecting part communicating with the lower compartment, whereby absolute or relative displacement of the magnet coupled with the diaphragm support is measured accurately in response to upward and downward movement of the diaphragm, and thus the sensor detects pressure.

14. The accurate pressure sensor according to claim 6, further comprising:
- a diaphragm support coupled with a diaphragm, wherein an N or S pole surface of the magnet is arranged on the diaphragm support in a direction perpendicular to a direction of movement of the diaphragm;
- a magnetic sensor for locating the magnet, arranged parallel to the N or S pole surface and perpendicular to an underside of a lower case;
- a spring arranged between a lower portion of the diaphragm support and an underside of the lower case;
- the diaphragm dividing an inner space defined by an upper case and the lower case into upper and lower compartments;
- a positive pressure connecting part communicating with the upper compartment; and
- a negative pressure connecting part communicating with the lower compartment, whereby relative displacement of the magnet coupled with the diaphragm support is measured accurately in response to upward and downward movement of the diaphragm, and thus the sensor detects pressure.

15. The accurate pressure sensor according to claim 7, further comprising:
- a diaphragm support coupled with a diaphragm, wherein an N or S pole surface of the magnet is arranged on the diaphragm support in a direction perpendicular to a direction of movement of the diaphragm;
- a magnetic sensor for locating the magnet, arranged parallel to the N or S pole surface and perpendicular to an underside of a lower case;
- a spring arranged between a lower portion of the diaphragm support and an underside of the lower case;
- the diaphragm dividing an inner space defined by an upper case and the lower case into upper and lower compartments;
- a positive pressure connecting part communicating with the upper compartment; and
- a negative pressure connecting part communicating with the lower compartment, whereby relative displacement of the magnet coupled with the diaphragm support is measured accurately in response to upward and downward movement of the diaphragm, and thus the sensor detects pressure.

16. The accurate pressure sensor according to claim 8, further comprising:
- a diaphragm support coupled with a diaphragm, wherein an N or S pole surface of the magnet is arranged on the diaphragm support in a direction perpendicular to a direction of movement of the diaphragm;
- a magnetic sensor for locating the magnet, arranged parallel to the N or S pole surface and perpendicular to an underside of a lower case;
- a spring arranged between a lower portion of the diaphragm support and an underside of the lower case;
- the diaphragm dividing an inner space defined by an upper case and the lower case into upper and lower compartments;
- a positive pressure connecting part communicating with the upper compartment; and
- a negative pressure connecting part communicating with the lower compartment, whereby relative displacement of the magnet coupled with the diaphragm support is measured accurately in response to upward and downward movement of the diaphragm, and thus the sensor detects pressure.

* * * * *